United States Patent
Chu et al.

(10) Patent No.: US 8,351,954 B2
(45) Date of Patent: Jan. 8, 2013

(54) PERSONAL INDEPENDENT BASIC SERVICE SET CLUSTER RESOURCE SHARING

(75) Inventors: Liwen Chu, San Ramon, CA (US); George Vlantis, Sunnyvale, CA (US)

(73) Assignee: STMicroelectronics, Inc., Coppell, TX (US)

( * ) Notice: Subject to any disclaimer, the term of this patent is extended or adjusted under 35 U.S.C. 154(b) by 343 days.

(21) Appl. No.: 12/813,168

(22) Filed: Jun. 10, 2010

(65) Prior Publication Data

US 2010/0317388 A1 Dec. 16, 2010

Related U.S. Application Data

(60) Provisional application No. 61/185,858, filed on Jun. 10, 2009.

(51) Int. Cl.
*H04W 72/04* (2009.01)

(52) U.S. Cl. .......... 455/452.1; 455/414.2; 455/509; 455/454

(58) Field of Classification Search ........ 455/452.1, 455/414.2, 422.1, 446, 450, 451, 452.2, 453, 455/454, 449, 502, 509, 516, 517, 67.11; 370/338, 336, 444

See application file for complete search history.

(56) References Cited

U.S. PATENT DOCUMENTS

| | | | |
|---|---|---|---|
| 7,564,826 B2 * | 7/2009 | Sherman et al. | 370/338 |
| 2004/0002357 A1 | 1/2004 | Benveniste | |
| 2007/0171858 A1 | 7/2007 | Grandhi et al. | |
| 2008/0112351 A1 | 5/2008 | Surineni et al. | |
| 2010/0176929 A1 | 7/2010 | Ozdemir et al. | |
| 2010/0220690 A1 * | 9/2010 | Majkowski et al. | 370/336 |
| 2011/0038357 A1 * | 2/2011 | Gong | 370/338 |

OTHER PUBLICATIONS

Sharma, Gaurav et al., "Performance Analysis of Contention Based Medium Access Control Protocols", School of Electrical and Computer Engineering, Purdue University, West Lafayette, IN, No Date, pp. 17.

Han, Bo et al., "Channel Access Throttling for Overlapping BSS Management", Department of Computer Science, University of Maryland, College Park, MD, No Date, pp. 1-6.

Chang, Ying. "Cooperation in Clustered Cellular Systems", Ad Hoc Networks 4, (2006), pp. 326-358.

* cited by examiner

*Primary Examiner* — John J Lee
(74) *Attorney, Agent, or Firm* — Hogan Lovells US LLP

(57) ABSTRACT

In a PBSS cluster environment, the beacon interval is allocated such that each PBSS in a PBSS cluster possesses its own master sub-beacon interval. Moreover, each member of the PBSS cluster can share unoccupied sub-beacon intervals. When a master PBSS fails to use its own master sub-beacon interval or the beacon intervals which are unoccupied, the available idle time within the beacon interval can be utilized by other member PBSSs in the PBSS cluster. As available or idle beacon interval time is allocated, each master PBSS retains the highest priority to its own master sub-beacon interval thus providing immediate access to a beacon interval when necessary.

23 Claims, 5 Drawing Sheets

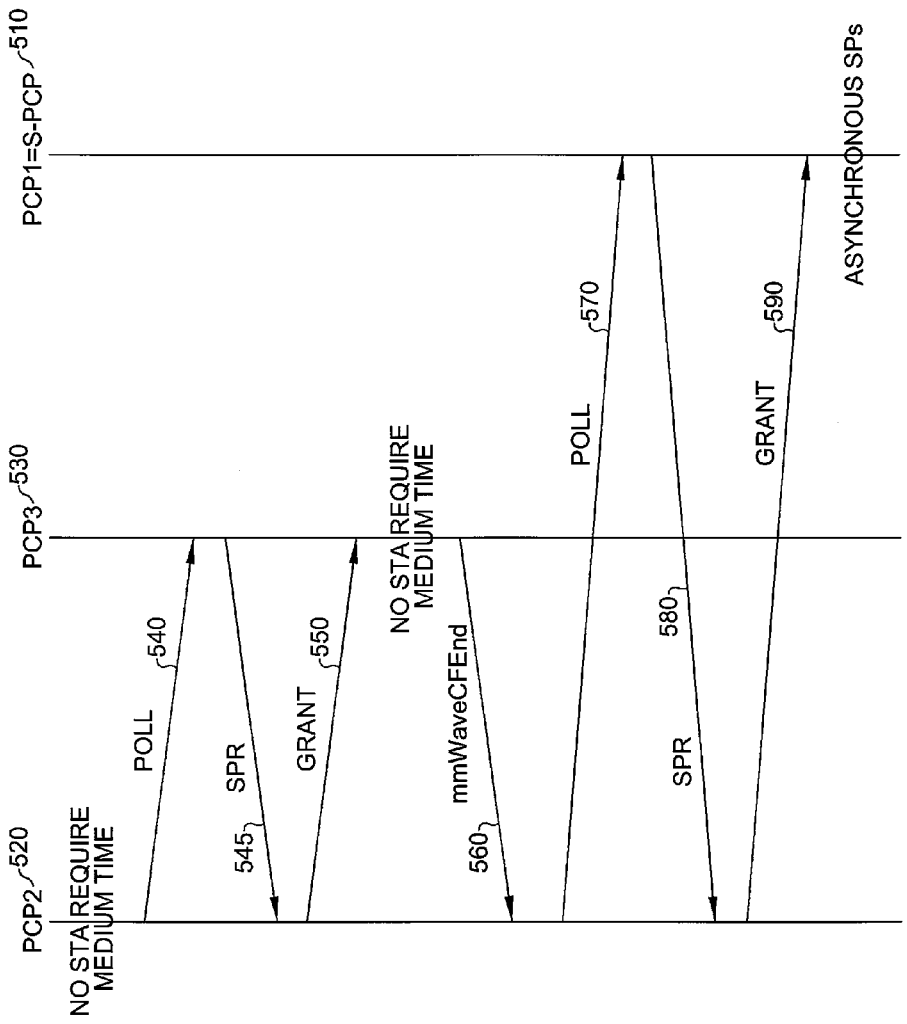

PERSONAL INDEPENDENT BASIC SERVICE SET CLUSTER RESOURCE SHARING

RELATED APPLICATION

The present application relates to and claims the benefit of priority to U.S. Provisional Patent Application No. 61/185,858 filed Jun. 10, 2009 which is hereby incorporated by reference in its entirety for all purposes as if fully set forth herein.

BACKGROUND OF THE INVENTION

1. Field of the Invention

Embodiments of the present invention relate, in general, to resource sharing in wireless networks and more particularly to resource sharing in a personal independent basic service set cluster.

2. Relevant Background

Within wireless communication systems, a wireless communication device is normally referred to as a station or STA (e.g., a wireless station). Examples of wireless stations (STAs) include a wide variety of wireless communication devices (e.g., computers including laptop computers, PDAs, cell phones, etc.). In addition, various wireless communication systems can be configured to operate using different means of communication (e.g., ad hoc, peer to peer, etc.). The basic building block of a wireless network is a Basic Service Set (BSS). A BSS is a group of STAs that communicate with each other. Communications take place within the area surrounding these stations called a Basic Service Area (BSA). The BSA is defined by the propagation characteristics of the wireless medium.

An Independent BSS (IBSS) is one in which stations can communicate directly with each other and thus must be within direct communication range. Typically, IBSS networks are composed of small numbers of stations set up for a specific purpose or for a short period of time. One common use is to create a short-lived network to support a single meeting in a conference room. Due to the short duration, small size, and focused purpose, IBSSs are sometimes referred to as ad hoc BSS or an ad hoc network. Such small personalized type of ad hoc networks are also referred to as personal or private IBSS networks (PBSS).

In some wireless communication systems, a PBSS coordinator point (PCP) may operate as a central governing communication device to which and through which various other STAs within the wireless communication systems communicate. For example, the PCP may serve as a coordinator of various other STAs within the wireless communication system or BSS, and it may also serve as a gateway to another network (e.g., a wide area network (WAN), the Internet, etc.).

Access to the wireless medium through which the stations communicate is controlled by a coordination function. In a PBSS there are numerous ways to access the communication medium. These include a contention-based period or contention-based access, an isochronous service period or pseudo-static service period and asynchronous service period or a service period request/allocation per beacon interval.

A contention-based protocol (CBP) is a communications protocol for operating wireless telecommunication equipment that allows many users to use the same radio channel without pre-coordination. The "listen before talk" operating procedure in IEEE 802.11 is the most well known contention-based protocol. Using a contention based protocol multiple independent stations can interact without central control. Before attempting to transmit, each station checks whether the medium is idle. If the medium is not idle, stations defer to each other and employ an orderly exponential back-off algorithm to avoid collisions.

"Isochronous" literally means to occur at the same time or at equal time intervals. In general English language, it refers to something that occurs at a regular interval of the same duration, as opposed to synchronous which refers to more than one thing happening at the same time. The term is used in different technical contexts, but often refers to the primary subject maintaining a certain interval, despite variations in other measurable factors in the same system.

In telecommunication, isochronous is known to mean a periodic signal pertaining to transmission in which the time interval separating any two corresponding transitions is equal to the unit interval or to a multiple of the unit interval When a transfer of information is "synchronous," the sending and receiving devices are synchronized, such as by using the same clock signal, and the transfer of information reoccurs at identical periodic intervals. For example, the input/output (IO) device 10 can send a synchronous message, indicating the camera's current mode, to the computer system 100 once every second. However, because the IO device 10 and the computer system 100, or components within the computer system 100, may be difficult to synchronize, a synchronous transfer of information may not be appropriate in some situations.

When a transfer of information is "isochronous," the sending and receiving devices are only partially synchronized, but the sending device transfers information to the receiving device at regular intervals. Such transfers can be used, for example, when information needs to arrive at the receiving device at the same rate it is sent from the sending device, but without precise synchronization of each individual data item. For example, an Input/Output device may send an isochronous stream of video information to the computer system which ensures that the information flows continuously, and at a steady rate, in close timing with the ability of the computer system to receive and display the video. While a synchronous transfer of information typically involves having each data transfer occur at the same time with respect to a clock signal, an isochronous transfer of information may require that up to "X" bits of data be transferred every "T" time units, although precisely when the X bits are transferred within the time T can vary.

In telecommunications, asynchronous communication is transmission of data without the use of an external clock signal. Any timing required to recover data from the communication symbols is encoded within the symbols. The most significant aspect of asynchronous communications is variable bit rate, or that the transmitter and receiver clock generators do not have to be exactly synchronized.

Each of the aforementioned techniques for access to the communication medium has advantages and disadvantages, both of which are amplified when PBSSs are clustered. PBSS clustering occurs when individual PBSS networks overlap. In such a situation interference mitigation of the overlapping networks is employed when each PBSS operates on the same channel. In such a situation the beacon intervals are aligned in the PBSS cluster. A spatial reuse mechanism is defined for fixed traffic mode (isochronous service period (SP)) in each PBSS.

FIG. 1 is a depiction of a spatial reuse mechanism for fixed traffic in a PBSS as would be known to one of ordinary skill in the relevant art. As shown three PBSS networks overlap in which each network includes two stations. Within each beacon interval each PBSS is given an offset time slot during which it may transmit. During this transmit period other PBSS networks within the PBSS cluster are prevented from transmission and relegated to a receive only mode.

It is not clear, however, how to allocate and share a beacon interval among overlapping PBSSs. Indeed a solution should harmonize all 3 kinds of time slot medium access techniques for data transmission: contention-based protocol, isochronous SP, and asynchronous SP. A need exists, therefore, for a method or protocol and associated system to define how to use a shared beacon interval among overlapping PBSS networks. These and other challenges of the prior art are addressed by one or more embodiments of the present invention.

SUMMARY OF THE INVENTION

According to one embodiment of the present invention, each PBSS in a PBSS cluster possesses its own master sub-beacon interval. Thus each PBSS within the PBSS cluster is considered to be the master of his unknown sub-beacon interval. Moreover, each member of the PBSS cluster can share unoccupied sub-beacon intervals. When a master PBSS fails to use its own master sub-beacon interval or the beacon intervals which are unoccupied, the available idle time within the beacon interval can be utilized by other member PBSSs in the PBSS cluster. As available or idle beacon interval time is allocated, each master PBSS retains the highest priority to its own master sub-beacon interval, thus providing immediate access to a beacon interval when necessary.

According to one embodiment of the present invention, a synchronization PCP (S-PCP) (note: PBSS Coordination Point (PCP)), which oversees and coordinates communication allocations among the overlapping PBSS networks in a cluster, fairly allocates beacon interval time to all of the members within the cluster. Alternatively each member of the PBSS cluster can share between interval time according to a fixed mode or established protocol. Contention-based periods in service periods are allocated by each member PBSS.

The features and advantages described in this disclosure and in the following detailed description are not all-inclusive. Many additional features and advantages will be apparent to one of ordinary skill in the relevant art in view of the drawings, specification, and claims hereof Moreover, it should be noted that the language used in the specification has been principally selected for readability and instructional purposes and may not have been selected to delineate or circumscribe the inventive subject matter; reference to the claims is necessary to determine such inventive subject matter.

BRIEF DESCRIPTION OF THE DRAWINGS

The aforementioned and other features and objects of the present invention and the manner of attaining them will become more apparent, and the invention itself will be best understood, by reference to the following description of one or more embodiments taken in conjunction with the accompanying drawings, wherein:

FIG. 5 is a communication flowchart between various PCPs in a PBSS cluster regarding unused beacon interval allocation according to one embodiment of the present invention.

Figure 1:
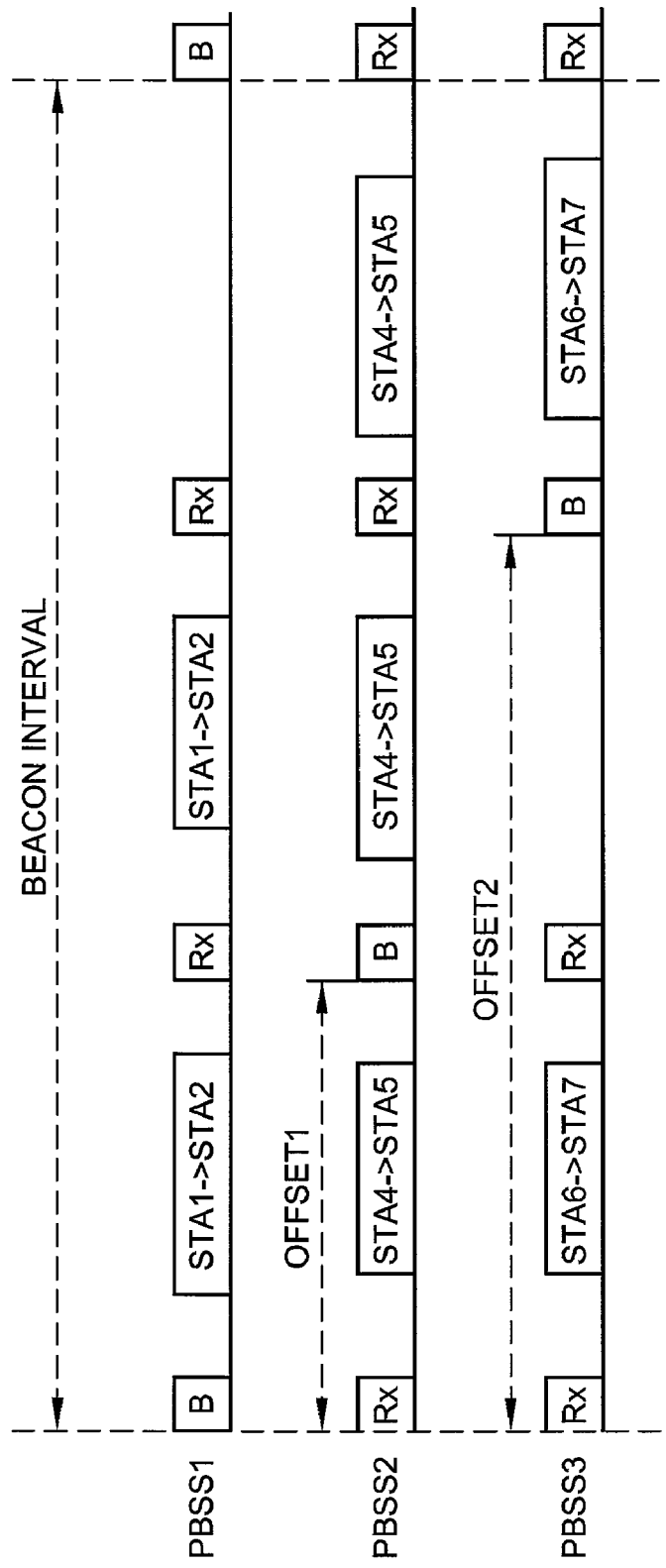
FIG. 1 depicts a spatial reuse mechanism for fixed traffic in a PBSS over a single beacon interval as would be known to one of ordinary skill in the relevant art.

The Figures depict embodiments of the present invention for purposes of illustration only. One skilled in the art will readily recognize from the following discussion that alternative embodiments of the structures and methods illustrated herein may be employed without departing from the principles of the invention described herein.

DESCRIPTION OF THE INVENTION

Embodiments of the present invention are hereafter described in detail with reference to the accompanying Figures. Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention.

The following description, with reference to the accompanying drawings, is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings but are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Included in the description are flowcharts depicting examples of the methodology which may be used to allocate beacon intervals among clustered PBSS networks. In the following description, it will be understood that each block of the flowchart illustrations, and combinations of blocks in the flowchart illustrations, can be implemented by computer program instructions. These computer program instructions may be loaded onto a computer or other programmable apparatus to produce a machine such that the instructions that execute on the computer or other programmable apparatus create means for implementing the functions specified in the flowchart block or blocks. These computer program instructions may also be stored in a computer-readable memory that can direct a computer or other programmable apparatus to function in a particular manner such that the instructions stored in the computer-readable memory produce an article of manufacture including instruction means that implement the function specified in the flowchart block or blocks. The computer program instructions may also be loaded onto a computer or other programmable apparatus to cause a series of operational steps to be performed in the computer or on the other programmable apparatus to produce a computer implemented process such that the instructions that execute on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based computer systems that perform the specified functions or steps, or combinations of special purpose hardware and computer instructions.

Figure 2:
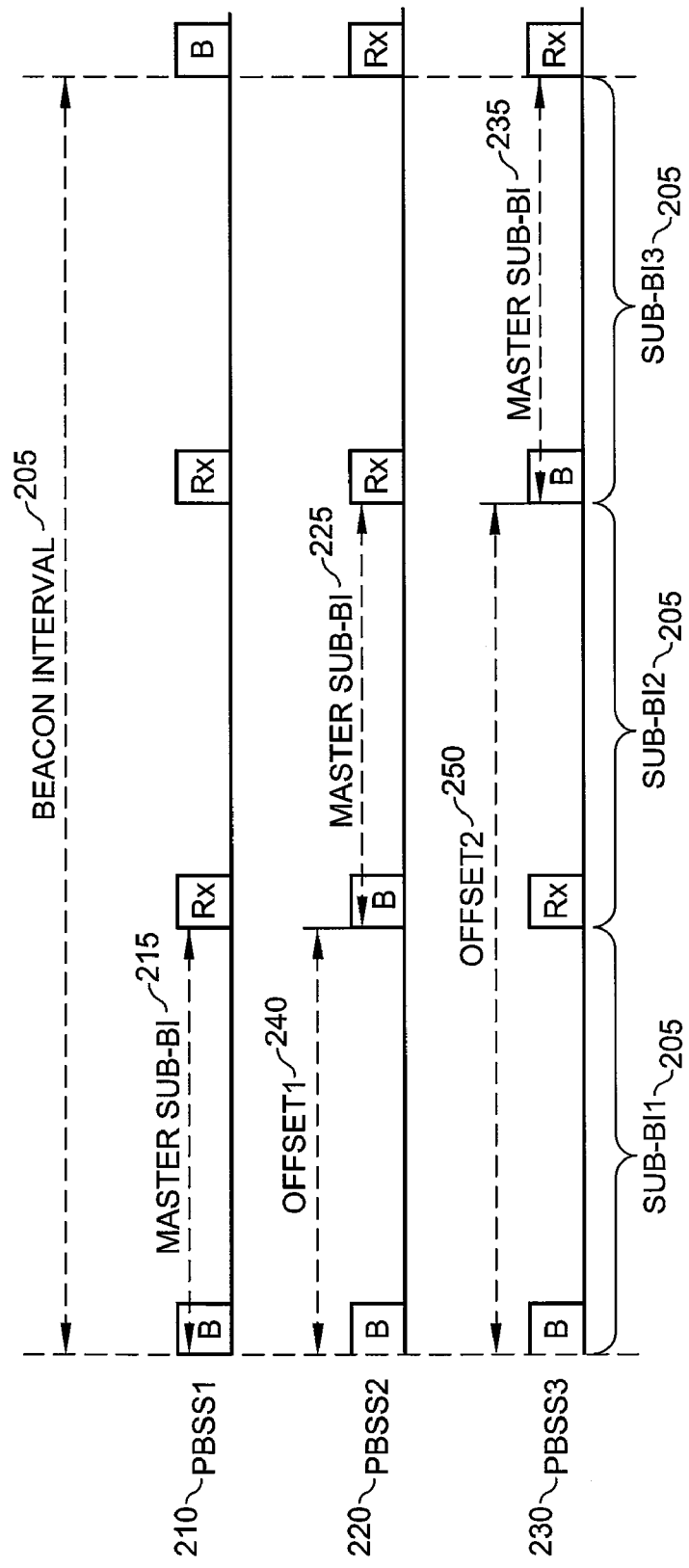
FIG. 2 shows one embodiment of a beacon interval allocation among 3 PBSS networks according to the present invention.

FIG. 2 depicts a beacon interval allocation among 3 PBSS clustered networks according to one embodiment of the present invention. In the allocation shown, each PBSS possesses its own master sub-beacon interval. Furthermore each member PBSS of the clustered network can share unallocated sub-beacon intervals. In FIG. 2, three PBSS networks exist in the clustered environment: PBSS 1 210, PBSS 2 220, and PBSS 3 230. The beacon interval 205 is allocated into three sub-beacon intervals 215, 225, 235.

According to one embodiment of the present invention, PBSS 1 210 is the master of the first master sub-beacon interval 215. During this portion of the beacon interval 205 PBSS 1 has priority to transmit data. PBSS 2 220 and PBSS 3 230 offset their respective master sub-beacon intervals 225, 235 by an offset 240, 250. Thus the master sub-beacon interval 225 for PBSS 2 220 is displaced by offset 1 240 and master sub-beacon interval 235 associated with PBSS 3 230 is displaced by offset 2 250. During times in which the PBSS is not actively transmitting it remains in a receive mode. Therefore, while PBSS 1 is transmitting during its master sub-beacon interval 215, PBSS 2 220 and PBSS 3 230 remain in the receive only mode of operation.

It is possible that a PBSS will not use the entirety of its allocated sub-beacon interval. During such a situation the master PBSS or the PBSS in charge of that particular sub-beacon interval can allow other member PBSS networks in the cluster to use the idle time within its own sub-beacon interval. Such an allocation of the sub-beacon interval time remains in the control of the master PBSS, which has the highest priority for its own sub-beacon interval.

FIG. 3 shows two alternative allocations of a beacon interval among a cluster of PBSS networks according to one embodiment of the present invention. Within a clustered PBSS network, a synchronization PCP allocates beacon interval time to each of the member PBSS networks. Alternatively each member of the PBSS cluster can share its beacon interval time according to a fixed mode or protocol. In the latter alternative, unoccupied sub-beacon interval time is fairly allocated among all the members of the PBSS cluster.

Figure 3A:
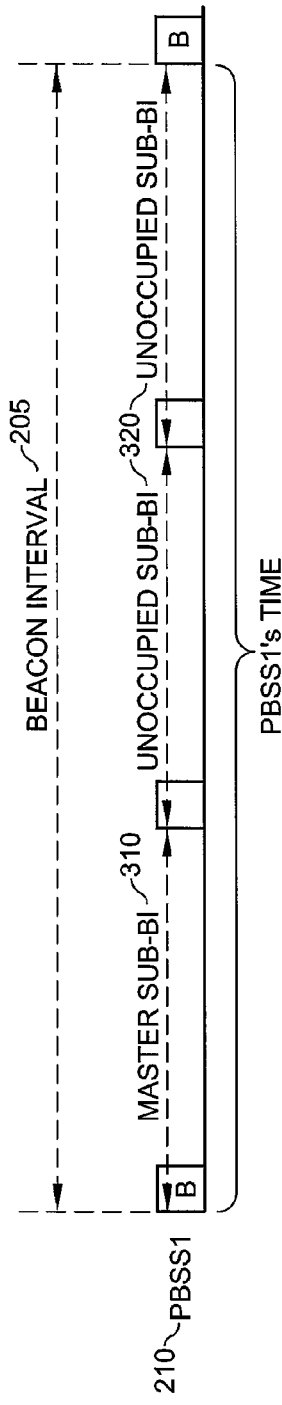
FIG. 3A and FIG. 3B show alternative beacon interval allocations according to one embodiment of the present invention.

FIG. 3A shows the allocation of the beacon interval 205 by a single PBSS 210. Since there is a single PBSS vying for the beacon interval time, the entire beacon interval is allocated to PBSS 1 210. Nonetheless the beacon interval is divided into three sub-beacon intervals. PBSS 1 210 is the master of the first sub-beacon interval 310. The remaining sub-beacon intervals 320 are allocated for use by PBSS 1 210 thereby providing PBSS 1 210 with use of the entire beacon interval 205.

Figure 3B:
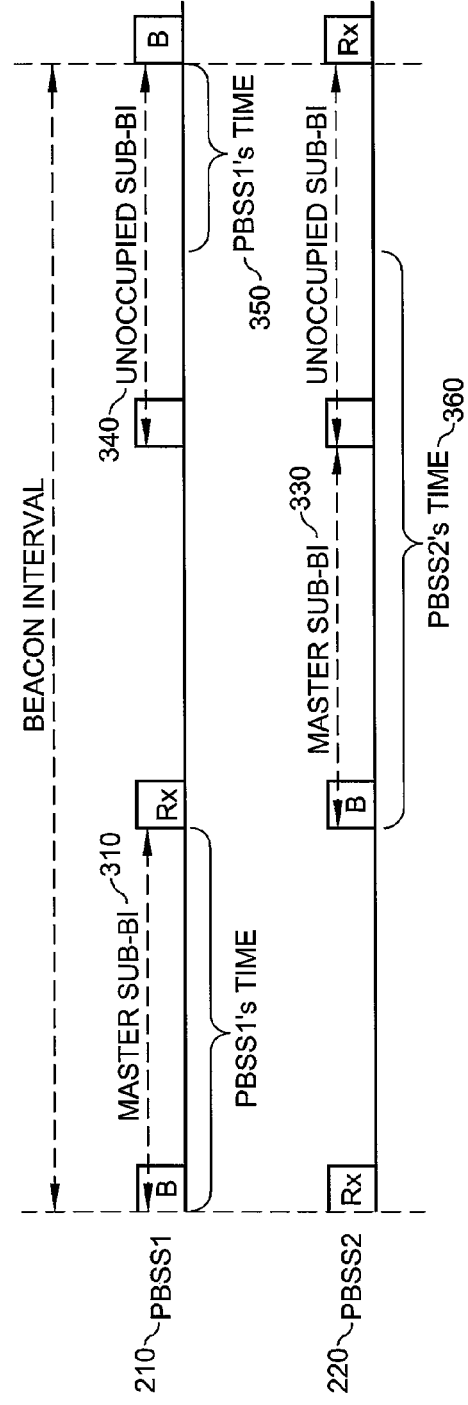

FIG. 3B depicts the same beacon interval 205 but with the addition of a second PBSS, PBSS 2 220. As shown in FIG. 3A, PBSS 1 210 is the master of the first sub-beacon interval 310 and remains in control of its sub-beacon interval 310. PBSS 2 220 is the master of and in control of the second sub-beacon interval 330. The remaining unoccupied sub-beacon interval 340 is, in this embodiment of the present invention, split equally between PBSS 1 210 and PBSS 2 220. Thus, as shown, PBSS 1 210 possesses control of the first sub-beacon interval 310 and the latter half of the last sub-beacon interval 340; the total time controlled by PBSS1 210 is referred to with reference numeral 350. Similarly, PBSS 2 220 retains control of the second sub-beacon interval 330 along with the first half of the unoccupied sub-beacon interval 340 thus creating a larger transmit opportunity time for PBSS 2 360.

In each case of the scenario described above, each member PBSS allocates its contention based period and its service period in the time which it owns. Thus for PBSS 1 210 its contention based period is allocated over the first sub-beacon interval 310 in the latter half of the unoccupied sub-beacon interval 350. Likewise the contention based period of PBSS 2 220 occurs during PBSS 2's time 360.

Figure 4A:
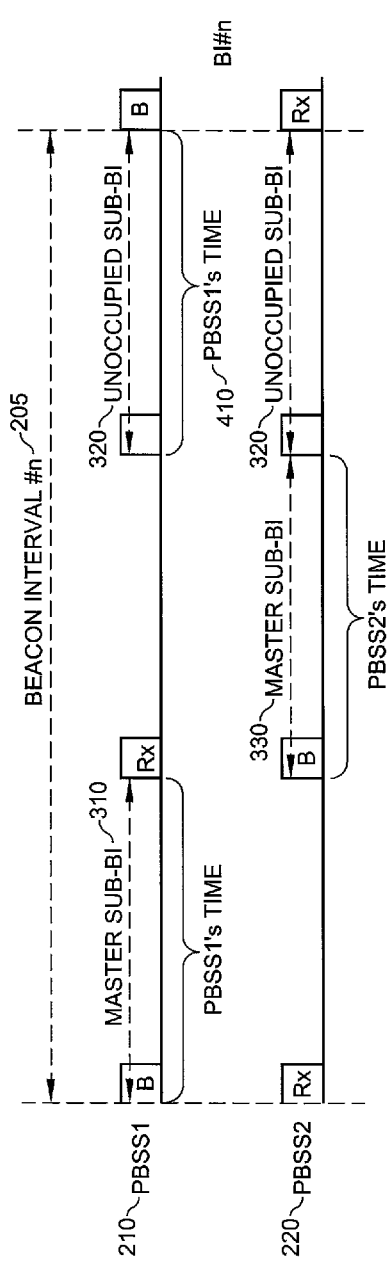
FIG. 4A and FIG. 4B show alternative beacon interval allocations according to one embodiment of the present invention.
Figure 4B:
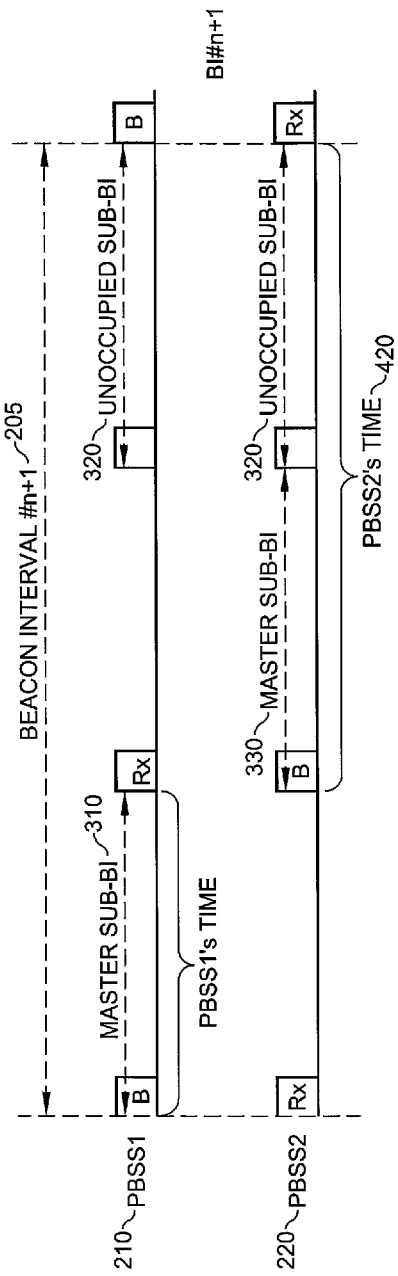

FIG. 4A and FIG. 4B depict an alternate allocation of the beacon interval among PBSS networks within a clustered environment according to one embodiment of the present invention. Both FIG. 4A and FIG. 4B depict the allocation of the beacon interval 205 between two PBSS networks. In FIG. 4A, PBSS 1 210 remains in control of the first sub-beacon interval 310 and PBSS 2 220 remains in control of the second sub-beacon interval 330. However, unlike the example shown in FIG. 3B, FIG. 4A depicts a scenario in which the beacon interval has allocated the first sub-beacon interval 310 and the unoccupied sub-beacon interval 320 to PBSS 1 210. Thus the time PBSS 1 210 has to transmit 410 is twice that of the time allotted for PBSS 2 220.

Note that in the examples presented above the beacon interval has been allocated into three equal sub-beacon intervals. There is no contention in the examples presented above. If a particular PBSS does not use part or all of its allocated sub-beacon interval, then the other PBSS networks within the clustered environment can contend for the unused sub-beacon interval time. For example, FIG. 3B shows that half the unoccupied sub-beacon interval 340 is allocated to PBSS 2 220. If PBSS 2 220 does not have enough data to transmit during its allocated time period, PBSS 1 can contend to use that unused time. But if PBSS 2 220 possesses enough data to transmit in its allocated portion of the unoccupied sub-beacon interval 320, PBSS 2 220 has priority over PBSS 1 210.

The examples presented in FIG. 3 and FIG. 4 depict an allocation of a beacon interval into three sub-beacon intervals. The division of the beacon interval is decided by the highest ranking PCP in the clustered environment. In the example presented, the highest-ranking or synchronization PCP has elected that three PBSS networks can participate in the use of the beacon interval. The determination of how might the beacon interval be divided is based on a number of factors, such as interference, that are beyond the scope of the present invention.

Once a beacon interval has been allocated among the participating PBSS networks within the cluster, the allocation of unused time within each allocated sub-beacon interval must be considered.

According to one embodiment of the present invention, unused beacon interval time is normally used for dynamic bandwidth allocation. In such a situation the master PCP, or the PCP in charge of that particular allocation of the beacon interval, will poll each station within its respective BSS and try to allocate the unused time among these stations. If, after polling its respective stations, none of the stations within its BSS request a portion of the unused time, the master PCP can allow other member PCP in the clustered environment to try to use the allocated unused time.

The allocation of the unused beacon interval time can be accomplished by either implicit or explicit techniques. According to one embodiment of the present invention, implicit allocation of unused beacon interval time is accomplished by member PCPs trying to detect transmissions by the master PBSS after a defined delay.

Consider "n" PBSS networks each with a PCP. In this example PCP [1] is the synchronization PCP. Each PCP [i] attempts to allocate unused beacon interval time to its associated stations. Each of these PCPs recognizes that the time that it is trying to allocate to its stations is not under its control. Thus, when other member PCPs cannot detect the transmission of the master PBSS after a defined delay, they attempt to allocate the unused time to their associated stations. But each PCP within the clustered environment possesses a different priority. According to one embodiment of the present invention, a priority sequence from PCP [i+1], . . . to PCP [n], PCP [1], . . . to PCP [i−1] ensures an orderly allocation of unused time. Each of the various PCP has an increased delay by which it has to wait to determine whether the unallocated time is being used.

For example, assume that a PCP cannot use all of its allocated time. After determining whether its associated stations can use its unused allocated time, the PCP will release an unused time for use message to the other PCPs within the clustered network. The other PCPs, upon receiving this allocation information through detecting a beacon frame or an announce frame, will attempt to detect a transmission. So if the master PCP allocated the unused time to one or more of its associated stations, the other PCPs within the clustered environment will detect transmissions. After waiting a defined delay of time, the other PCPs within the clustered environment will attempt to allocate the unused time. For example, PCP [2] will allocate some of the time to its stations. Thereafter PCP [3] will attempt to allocate some of the remaining unused time to its stations. Eventually the unused or unallocated time will be utilized by the other PBSS networks within the clustered environment. Recall that the master PCP for the unallocated time retains priority should it need to utilize that time.

Another method for allocating unused beacon interval time according to the present invention is an explicit allocation. According to this method of unused time allocation the master PCP, which recognizes that it cannot use all of its allocated beacon interval time, polls other members of the clustered environment. Using a repetitive technique, each PCP within the clustered environment is polled to see if it can use the unallocated time. Once the time has been used the polling ceases.

For example:
Each master PCP (PCP[i]) tries to allocate unused time to its STAs.

If the master PCP allocates all the unused time to its STAs,
Stop.
Otherwise,
For (m=i+1 to n)
PCP[i] gives the unused time to PCP[m].
PCP[m] tries to allocate unused time to its STAs.
If PCP[m] can allocate the unused time to its STAs,
Stop.
For (m=1 to i−1)
PCP[i] gives the unused time to PCP[m].
PCP[m] tries to allocate unused time to its STAs.
If PCP[m] can allocate the unused time to its STAs,
Stop FIG. 5 is a communication flowchart showing a PCP polling with respect to allocated beacon interval time. In this example, 3 PBSS networks represented by PCP 1 510, PCP 2 520 and PCP 3 530 share the beacon interval time of a particular clustered environment. In this example PCP 2 520 has unused beacon interval time. Before polling the other PCPs within the clustered environment, PCP 2 520 determines that no stations within its area of responsibility require additional time. Thereafter PCP 2 520 polls 540 PCP 3 530 to determine whether PCP 3 530 needs additional beacon interval time. Before PCP 3 530 can determine whether its stations require more time, PCP 3 530 must request a release from PCP 2 520 of the unallocated beacon interval time. PCP 3 530 therefore issues a request 545 to PCP 2 520 for the unallocated beacon interval time. PCP 2 520 grants the request 550 giving PCP 3 530 the ability to poll its stations to determine whether they need additional time.

In the example of FIG. 5, PCP 3 530 determines that no stations within its area of responsibility require additional time. It therefore waives its need for additional transmission time 560 sending the unallocated time back to PCP 2 520. PCP 2 520 then polls 570 PCP 1 510 to determine whether PCP 1 510 has stations within its area of responsibility that need additional time. Again in PCP 1 510 seeks a release 580 of additional time from PCP 2 520. PCP 2 520 grants the release of the time 590 to PCP 1 510. In this example PCP 1 510 use of the unallocated time ends the process.

Another embodiment of the present invention mitigates the polling and granting process described with respect to FIG. 5. The polling step can be replaced by a single releasing step removing the need of the originating PCP to grant the unallocated time to the requesting PCP. According to this modified embodiment of the present invention, the owning PCP releases the time in its initial poll and this release is simply acknowledged by the accepting PCP. Should the accepting PCP fail to use the time, the time allocation is waived back to the originating PCP.

Recall that within each beacon interval exists a contention based period (CBP). Typically stations under the control of a master PBSS use the CBP for data transmission using buffered frames. The stations within the PBSS contend for use of this data transmission capability. However in cases where no stations within the responsibility of the master PBSS are in the condition to use the existing CBP, other stations within other neighboring PBSS networks may contend to utilize the unused portions of the CBP of another PBSS.

These contending stations have a lower priority (a large contention window) compared to the stations within the master PBSS. Consider the following example. A station operating in its master's PBSS sub-beacon interval will use a contention window, CW[n] for its access category n. A station that is not in the master sub-beacon interval will use a contention window, CW[n+1] or its access category n. If a PCP receives a targeted clear send (TCTS) message from another PBSS, it will not respond to a targeted request to send (TRTS) message received from a station within its PBSS.

Embodiments of the present invention also address PBSS clustering spatial reuse. After an isochronous SP is stopped and a new isochronous SP is allocated in the same position in the master PBSS, the isochronous SP of a member PBSS may interfere with the new isochronous SP of a master PBSS. In this case the member PBSS stops the interfering SP by reallocating the SP.

For example, consider the situation in which the clustered network includes three PBSSs. In PBSS 1's master beacon interval, PBSS 1 allocates a portion of its time for pseudo-static transmission. After this allocation, the pseudo-static service will not change for a considerable length of time. Therefore PBSS 2 and PBSS 3 (referring to FIG. 1) can allocate a pseudo-static service period if this pseudo-static interval does not interfere with the master PBSS transmission. This is a kind of spatial reuse. After some period or length of time, PBSS 1 will allocate the same time slot for other stations transmissions. For example, assume PBSS 1 allocates a pseudo-static service interval to station 1 to transmit data to station 2. Since the communication between station 4 and station 5 of PBSS 2 does not interfere with the communication between station 1 and station 2, PBSS 2 can allocate the same pseudo-static interval to stations 4 and 5. The same scenario occurs to the communication between station 6 and station 7 in PBSS 3. However, after the communication between station 1 and station 2 finishes, PBSS 1 can allocate the time slot to another two stations: station 9 and station 10. After PBSS 1 allocates the time slot to stations 9 and 10, PBSS 2's transmission between station 4 and station 5 may interfere with PBSS 1's transmission between station 9 station 10. To alleviate this problem, a higher priority is given to PBSS 1's pseudo-static SP since the time slot is in PBSS 1's master sub-beacon interval. Once interference is recognized PBSS 2 stops data transmission and reallocates its time using its master sub-beacon interval.

The communication apparatus described in the present invention is illustrative of various wireless devices including, for example, mobile and cellular phone handsets, machine-to-machine (M2M) communication networks (e.g., wireless communications for vending machines), so-called "911 phones" (a mobile handset configured for calling the 911 emergency response service), as well as devices employed in emerging applications such as 3G, 4G, satellite communications, and the like. As such, wireless communication apparatus may provide RF reception functionality, RF transmission functionality, or both (i.e., RF transceiver functionality).

The communication apparatus of the present invention may be configured to implement one or more specific communication protocols or standards including those described in 802.11, as desired. For example, in various embodiments communication apparatus may employ a time-division multiple access (TDMA) standard or a code division multiple access (CDMA) standard to implement a standard such as the Global System for Mobile Communications (GSM) standard, the Personal Communications Service (PCS) standard, and the Digital Cellular System (DCS) standard. In addition, many data transfer standards that work cooperatively with the GSM technology platform may also be supported. For example, communication apparatus may also implement the General Packet Radio Service (GPRS) standard, the Enhanced Data for GSM Evolution (EDGE) standard, which may include Enhanced General Packet Radio Service standard (E-GPRS) and Enhanced Circuit Switched Data (ESCD), and the high speed circuit switched data (HSCSD) standard, among others.

Embodiments of the present invention have been herein described with reference to various wireless networks and their associated communication devices. Networks can also include mainframe computers or servers, such as a gateway computer or application server (which may access a data repository). A gateway computer serves as a point of entry into each network. The gateway may be coupled to another network by means of a communications link. The gateway may also be directly coupled to one or more devices using a communications link. Further, the gateway may be indirectly coupled to one or more devices. The gateway computer may also be coupled to a storage device such as data repository.

Those skilled in the art will appreciate that the gateway computer may be located a great geographic distance from the network, and similarly, the devices may be located a substantial distance from the networks. For example, the network may be located in California, while the gateway may be located in Texas, and one or more of the devices may be located in New York. The devices may connect to the wireless network using a networking protocol such as the Transmission Control Protocol/Internet Protocol ("TCP/IP") over a number of alternative connection media, such as cellular phone, radio frequency networks, satellite networks, etc. The wireless network preferably connects to the gateway using a network connection such as TCP or UDP (User Datagram Protocol) over IP, X.25, Frame Relay, ISDN (Integrated Services Digital Network), PSTN (Public Switched Telephone Network), etc. The devices may alternatively connect directly to the gateway using dial connections. Further, the wireless network and network may connect to one or more other networks (not shown), in an analogous manner.

In some preferred embodiments, the present invention can implemented in software while in others it can be implemented in firmware, hardware or a combination thereof Software programming code which embodies the present invention is typically accessed by the microprocessor (e.g. of device and/or server) from long-term storage media of some type, such as a CD-ROM drive or hard drive. The software programming code may be embodied on any of a variety of known media for use with a data processing system, such as a diskette, hard drive, or CD-ROM. The code may be distributed on such media, or may be distributed from the memory or storage of one computer system over a network of some type to other computer systems for use by such other systems. Alternatively, the programming code may be embodied in the memory, and accessed by the microprocessor using the bus. The techniques and methods for embodying software programming code in memory, on physical media, and/or distributing software code via networks are well known and will not be further discussed herein.

A user may connect his/her computer to a server using a wireline connection or a wireless connection. Wireline connections are those that use physical media such as cables and telephone lines, whereas wireless connections use media such as satellite links, radio frequency waves, and infrared waves. Many connection techniques can be used with these various media, such as: using the computer's modem to establish a connection over a telephone line; using a LAN card such as Token Ring or Ethernet; using a cellular modem to establish a wireless connection; etc. The user's computer may be any type of computer processor, including laptop, handheld or mobile computers; vehicle-mounted devices; desktop computers; mainframe computers; etc., having processing capabilities (and communication capabilities, when the device is network-connected). The remote server, similarly, can be one of any number of different types of computer which have processing and communication capabilities.

These techniques are well known in the art, and the hardware devices and software which enable their use are readily available. Hereinafter, the user's computer will be referred to equivalently as a "workstation", "device", or "computer", and use of any of these terms or the term "server" refers to any of the types of computing devices described above.

As will be understood by those familiar with the art, the invention may be embodied in other specific forms without departing from the spirit or essential characteristics thereof. Likewise, the particular naming and division of the modules, managers, functions, systems, engines, layers, features, attributes, methodologies, and other aspects are not mandatory or significant, and the mechanisms that implement the invention or its features may have different names, divisions, and/or formats. Furthermore, as will be apparent to one of ordinary skill in the relevant art, the modules, managers, functions, systems, engines, layers, features, attributes, methodologies, and other aspects of the invention can be implemented as software, hardware, firmware, or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

While there have been described above the principles of the present invention in conjunction with PBSS cluster resource sharing, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features that are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The Applicant hereby reserves the right to formulate new claims to such features and/or combinations of such features during the prosecution of the present application or of any further application derived therefrom.

We claim:

1. A system for resource sharing in personal independent basic service set wireless networks, comprising:
    a plurality of overlapping personal independent basic service set (PBSS) networks forming a PBSS cluster wherein each PBSS includes a PBSS control point (PCP) and one PCP is a synchronization PCP;
    a communication medium common to the PBSS cluster; and
    a common beacon interval shared among the plurality of overlapping PBSS networks wherein the synchronization PCP is configured to partition the common beacon interval into sub-beacon intervals and wherein each PCP in the PBSS cluster is allocated at least one sub-beacon interval.

2. The system of claim 1 wherein each PBSS network includes a PBSS beacon interval, the PBSS beacon intervals of the plurality of overlapped PBSS networks being aligned forming the common beacon interval.

3. The system of claim 1 wherein each sub-beacon interval is equal in size.

4. The system of claim 1 wherein each allocated sub-beacon interval is primarily controlled by a master PBSS and wherein during the allocated sub-beacon interval the master PBSS has exclusive transmission capability of the common beacon interval.

5. The system of claim 1 wherein each PBSS has primary access to at least one sub-beacon interval.

6. The system of claim 5 wherein each PBSS allocates a corresponding contention based period and service period from the at least one sub-beacon interval.

7. The system of claim 1 wherein at least one sub-beacon interval is unallocated.

8. The system of claim 7 wherein each PBSS network in the PBSS cluster can share unallocated sub-beacon intervals.

9. The system of claim 1 wherein each PCP can contend for unused sub-beacon interval time.

10. The system of claim 1 wherein unused sub-beacon interval time from a first PBSS network is explicitly allocated to other PBSS networks in the PBSS cluster.

11. A method for personal independent basic service set resource sharing, comprising:
    designating a personal independent basic service set (PBSS) control point (PCP) for each of a plurality of overlapping PBSSs wherein each PBSS operates on a common communication medium;
    aligning beacon intervals associated with each PBSS forming an aligned beacon interval;
    partitioning the aligned beacon interval into a plurality of sub-beacon intervals; and
    allocating to each PBSS priority use of at least one sub-beacon interval.

12. The method of claim 11 wherein each sub-beacon interval is equal in size.

13. The method of claim 11 wherein one of the PCPs of the plurality of overlapping PBSSs is a synchronization PCP and wherein the synchronization PCP allocates sub-beacon intervals to each PBSS.

14. The method of claim 11 wherein each PCP allocates within its PBSS contention based periods and service periods.

15. The method of claim 11 further comprising sharing unallocated sub-beacon intervals among the plurality of overlapping PBSSs.

16. The method of claim 11 wherein each PCP can contend for unused sub-beacon interval time.

17. The method of claim 11 further comprising explicitly allocating unused sub-beacon interval time among the plurality of overlapping PBSSs.

18. The method of claim 11 further comprising implicitly allocating unused sub-beacon interval time among the plurality of overlapping PBSSs.

19. A non-transitory computer-readable storage medium tangibly embodying a program of instructions executable by a machine wherein said program of instructions comprises a plurality of program codes for PBSS cluster resource sharing, said program of instructions comprising:
    program code for designating a personal independent basic service set (PBSS) control point (PCP) for each of a plurality of overlapping PBSSs wherein each PBSS operates on a common communication medium;

program code for aligning beacon intervals associated with each PBSS forming an aligned beacon interval;

program code for partitioning the aligned beacon interval into a plurality of sub-beacon intervals; and program code for allocating to each PBSS priority use of at least one sub-beacon interval.

20. The program of instructions tangibly embodied on the non-transitory computer-readable storage medium of claim 19 wherein the program of instructions includes program code for sharing unallocated sub-beacon intervals among the plurality of overlapping PBSSs.

21. The program of instructions tangibly embodied on the non-transitory computer-readable storage medium of claim 19 wherein the program of instructions includes program code for allocating unused sub-beacon interval time among the plurality of overlapping PBSSs.

22. The program of instructions tangibly embodied on the non-transitory computer-readable storage medium of claim 21 wherein allocating unused sub-beacon interval time among the plurality of overlapping PBSSs is explicit.

23. The program of instructions tangibly embodied on the non-transitory computer-readable storage medium of claim 21 wherein allocating unused sub-beacon interval time among the plurality of overlapping PBSSs is implicit.

* * * * *